(12) United States Patent
Stimel

(10) Patent No.: US 8,424,956 B2
(45) Date of Patent: Apr. 23, 2013

(54) AERODYNAMIC WHEEL COVER

(75) Inventor: William E. Stimel, Alexandria, OH (US)

(73) Assignee: CVG Management Corporation, New Albany, OH (US)

( * ) Notice: Subject to any disclaimer, the term of this patent is extended or adjusted under 35 U.S.C. 154(b) by 0 days.

(21) Appl. No.: 13/223,994

(22) Filed: Sep. 1, 2011

(65) Prior Publication Data
US 2012/0056444 A1    Mar. 8, 2012

Related U.S. Application Data

(60) Provisional application No. 61/379,950, filed on Sep. 3, 2010.

(51) Int. Cl.
*B62D 37/02*    (2006.01)
(52) U.S. Cl.
USPC ................................. 296/180.2; 296/180.1

(58) Field of Classification Search .... 296/180.1–180.5; 301/37.101, 37.102, 37.25, 37.42
See application file for complete search history.

(56) References Cited

U.S. PATENT DOCUMENTS

| | | | | |
|---|---|---|---|---|
| 5,820,203 | A  * | 10/1998 | Morelli et al. | 296/180.1 |
| 6,712,425 | B2 * | 3/2004  | Brulhart | 296/180.1 |
| 7,374,229 | B1 * | 5/2008  | Noll et al. | 296/180.2 |
| 7,681,942 | B2 * | 3/2010  | Van Der Westhuizen | 296/180.5 |
| 2007/0182207 | A1 * | 8/2007  | Nakaya | 296/180.1 |
| 2010/0156142 | A1 * | 6/2010  | Sumitani et al. | 296/180.1 |
| 2011/0080019 | A1 * | 4/2011  | Castillo | 296/180.1 |
| 2011/0204677 | A1 * | 8/2011  | Wood et al. | 296/180.1 |

* cited by examiner

*Primary Examiner* — Lori Lyjak
(74) *Attorney, Agent, or Firm* — Kegler Brown Hill & Ritter; James J. Pingor

(57) ABSTRACT

A wheel cover or panel assembly for use on a long haul truck is provided. These wheel covers can provide enhanced aerodynamic effects to a truck or other vehicle thereby reducing wind drag and enhancing fuel efficiency. Still further, the wheel covers can articulate or turn along with the steering by design.

20 Claims, 6 Drawing Sheets

AERODYNAMIC WHEEL COVER

CROSS-REFERENCE TO RELATED APPLICATIONS

This application claims the benefit of U.S. Provisional Patent application Ser. No. 61/379,950 entitled "AERODYNAMIC WHEEL COVER" and filed Sep. 3, 2010. The entirety of the above-noted application is incorporated by reference herein.

BACKGROUND

With today's emphasis on fuel savings and green energies, aerodynamics continue to be a priority of most vehicle design engineers. In accordance therewith, vehicle designs undergo many stringent wind tunnel tests that study the effects of air moving past solid objects.

Many years ago, wind tunnels were initially used as a means of studying airplanes in flight. Since then, emphasis on fuel efficiencies has prompted use of the wind tunnel in the design of land vehicles as well. The wind tunnel was envisioned as a means of reversing the usual paradigm. Rather than a moving a vehicle through still air, the wind tunnel moves the air past a still vehicle. Moving the air rather than the vehicle enables an engineer or researcher to more effectively study and manage aerodynamic effects.

In addition to aerodynamic effects, wind-tunnel testing is often applied to land vehicles to determine ways to reduce the power required to move the vehicle on roadways at a given speed. In the study of land vehicles, interaction between the road and the vehicle plays a significant role in performance and results. Thus, this interaction is taken into consideration when interpreting the test results. In actual scenarios, the roadway is moving relative to the vehicle but the air is stationary relative to the roadway. In most wind tunnel tests, air is moving relative to the roadway, while the roadway is stationary relative to the test vehicle. In order to address this phenomenon, some automotive-test wind tunnels employ moving belts under the test vehicle in an effort to approximate real-world conditions.

Today, aerodynamic hoods, roofs, skirts, etc. are employed to lower wind drag of land vehicles. There exists an ongoing need in the art to continue to develop aerodynamic products and designs that enhance wind drag efficiencies.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises an aerodynamic wheel cover for use on land vehicles. In aspects, the wheel cover can be applied to the front wheels of long-haul trucks in order to enhance aerodynamic effects and reduction of wind drag. The covers can be manufactured of a resilient material which permits the cover to flex when exposed to aerodynamic forces, however, the covers can be suitably rigid so as to refrain from contact with a rotating wheel.

In one aspect, the wheel cover(s) is fixedly mounted thereby creating an aerodynamic cover that can reduce wind drag. In another aspect of the subject innovation, the wheel cover(s) can turn or redirect with the wheel(s) and steering. For example, the cover can be attached to the wheel such that it turns as the wheel turns. In other aspects, the cover can be attached to the steering linkage to effect tracking of the wheel and steering.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
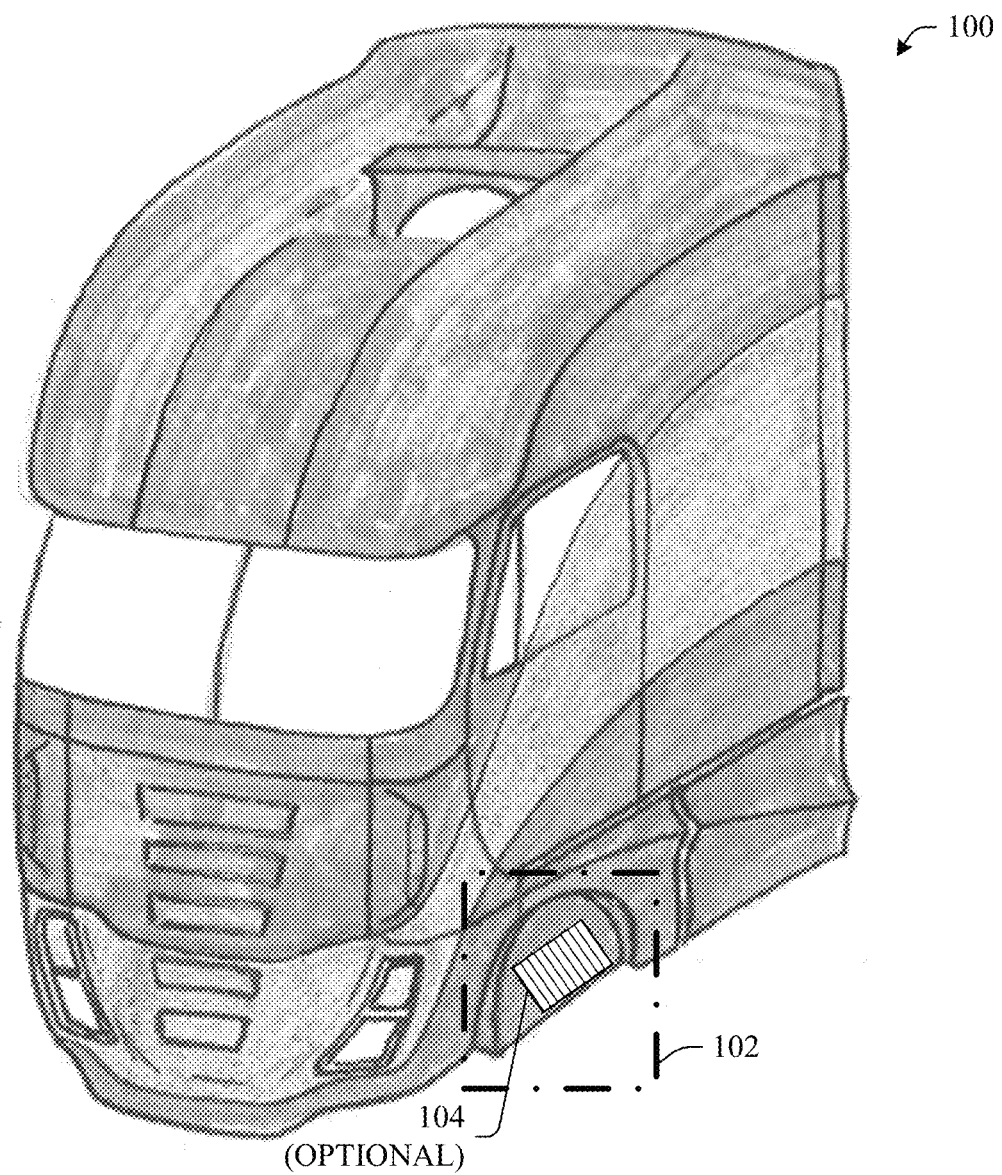
FIG. 1 illustrates an example perspective view of a truck having an aerodynamic wheel cover installed thereon.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

Referring initially to the drawings, FIG. 1 illustrates an example perspective view of a truck body 100 that employs an aerodynamic wheel cover 102 in accordance with the innovation. In aspects, the wheel cover 102 is applied to, or positioned outside, the front wheels of long-haul trucks in order to enhance aerodynamic effects and reduction of wind drag. It will be appreciated that, on multi-wheel steering vehicles, e.g., four-wheel steering, the articulating wheel cover 102 can be applied to the rear wheels as desired. In operation, covers 102 can be manufactured of a resilient material which permits the cover 102 to flex while being sufficiently rigid so as to withstand aerodynamic forces. It is to be appreciated that most any material, including but not limited to, plastic, aluminum, composite, metal, alloy, resilient material, non-resilient material, or the like can be employed to manufacture the wheel cover 102.

As will be shown and described in greater detail below, in aspects, the wheel cover(s) 102 is fixedly mounted thereby creating an aerodynamic cover that can reduce wind drag. In another aspect of the subject innovation, the wheel cover(s) 102 can turn, pivot or redirect (e.g., articulate) in synchronization with the wheel(s) and steering. For example, the cover 102 can be rotatably attached to the wheel such that it turns as the wheel turns. In other words, a rotatable hub can be employed to attach the wheel cover to the wheel (e.g., lugs 408). In still other aspects, the cover 102 can be attached to the steering linkage to effect tracking of the wheel and steering.

Figure 2:
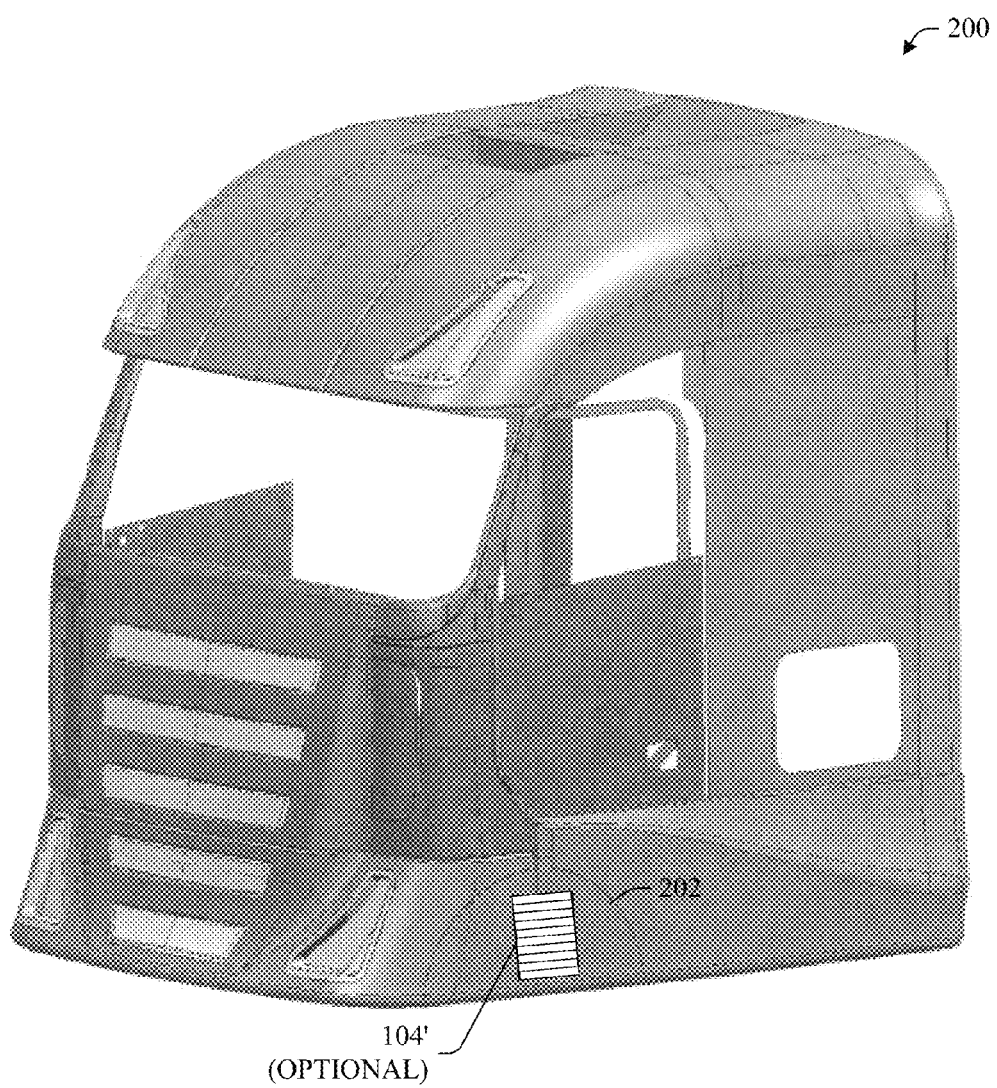
FIG. 2 illustrates an alternative example perspective view of a truck having an aerodynamic wheel cover installed thereon.
Figure 3:
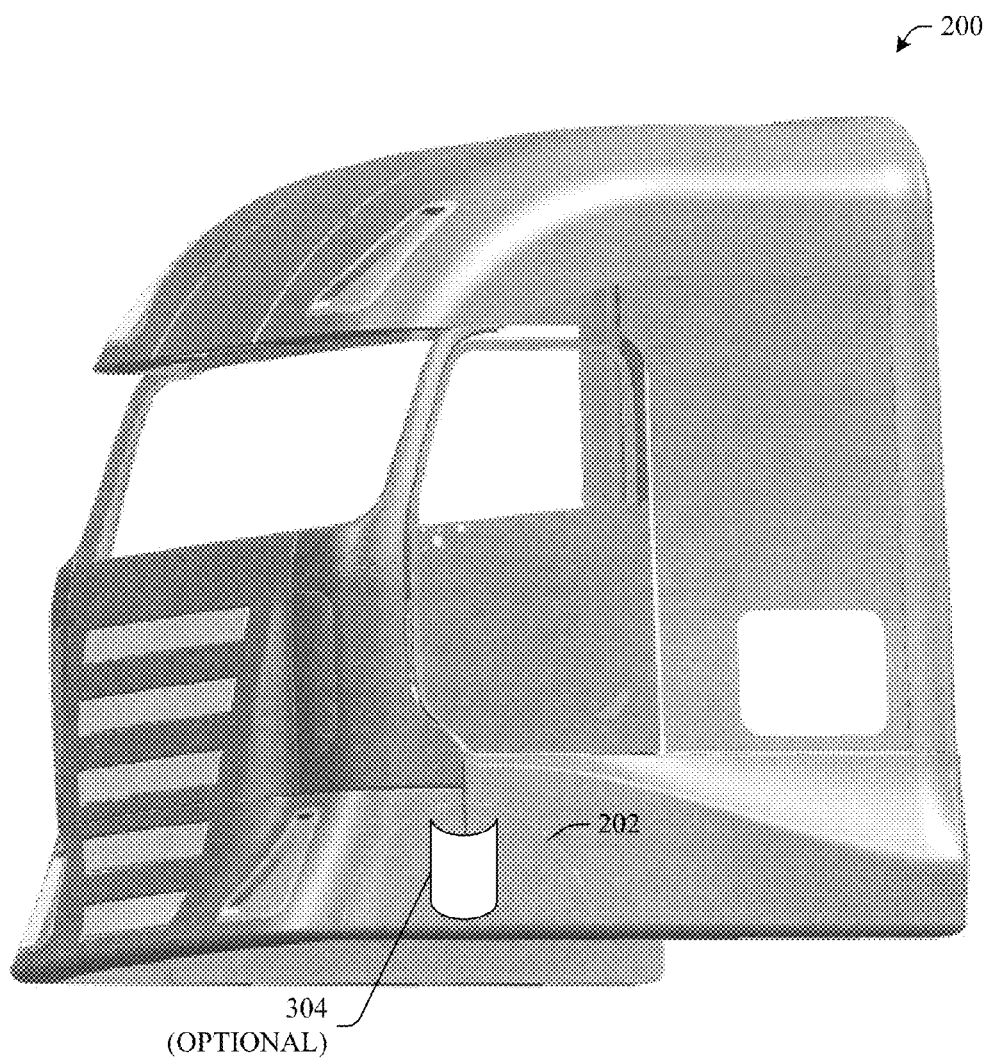
FIG. 3 illustrates an alternative example side view of a truck having an aerodynamic wheel cover installed thereon.

Referring now to FIGS. 2 and 3, an alternative example of a truck cab 200 having an aerodynamic wheel cover 202 incorporated therein is shown. As described herein, the wheel cover 202 can be integrally molded or attached as appropriate. The attachment can be fixedly or removeably by design. Further, the cover(s) 202 can be attached to the wheel and/or steering so as to effect movement with the wheel and/or steering.

It is to be understood that wheel cover 202 can be integrally molded into the overall body design of the truck shown in 200. In aspects, the wheel cover(s) 202 can be fixedly or removeably attached by way of brackets or other frictional attachment means. It is to be understood that most any bracket or attachment means can be used without departing from the features, functions and benefits of the innovation and claims appended hereto.

Figure 4:
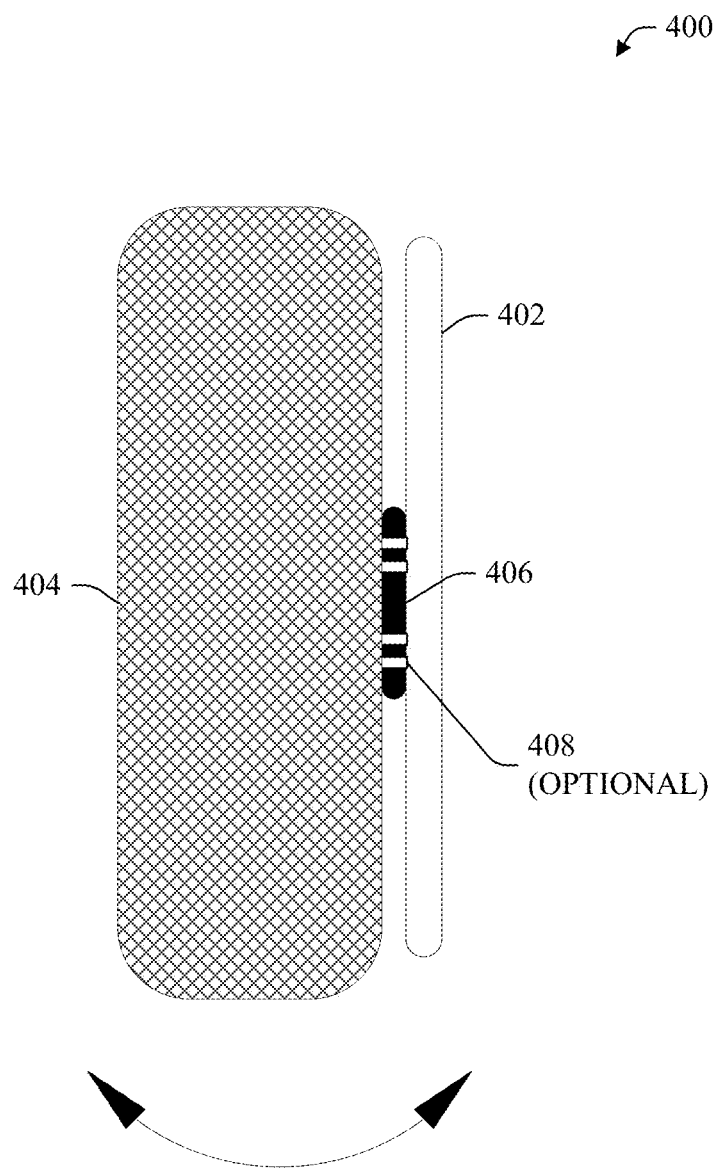
FIG. 4 illustrates an example wheel cover assembly in accordance with aspects of the innovation.

Referring now to FIG. 4, an example wheel cover assembly 400 is shown in accordance with aspects of the innovation. As illustrated, the cover assembly 400 can include a shield or cover panel 402 that is configured and positioned on a vertical plane consistent with a wheel 404. In this aspect, the cover portion 402 can be rotatably mounted to the wheel using a fixed connection 406. In this aspect, the cover can be of circular shape substantially the same (or smaller) size (circumference) of the wheel and/or tire. In other aspects, the cover 402 can be of a half moon or other shape so as to effect or enhance aerodynamic properties of the innovation.

In an aspect, the panel 402 can be directly mounted (e.g., bolted) to wheel lugs 408. In this embodiment, it will be appreciated that it is imperative that the cover 402 be of smaller size in relation to the outer circumference of the tire. In other aspects, adapter plates (not shown) can be employed to fixedly, and rotatably attach the panel to the wheel. It is to be appreciated that most any method of rotatably attaching a panel 402 to a wheel 404 is contemplated and to be included within the scope of this disclosure and claims appended hereto.

Figure 5:
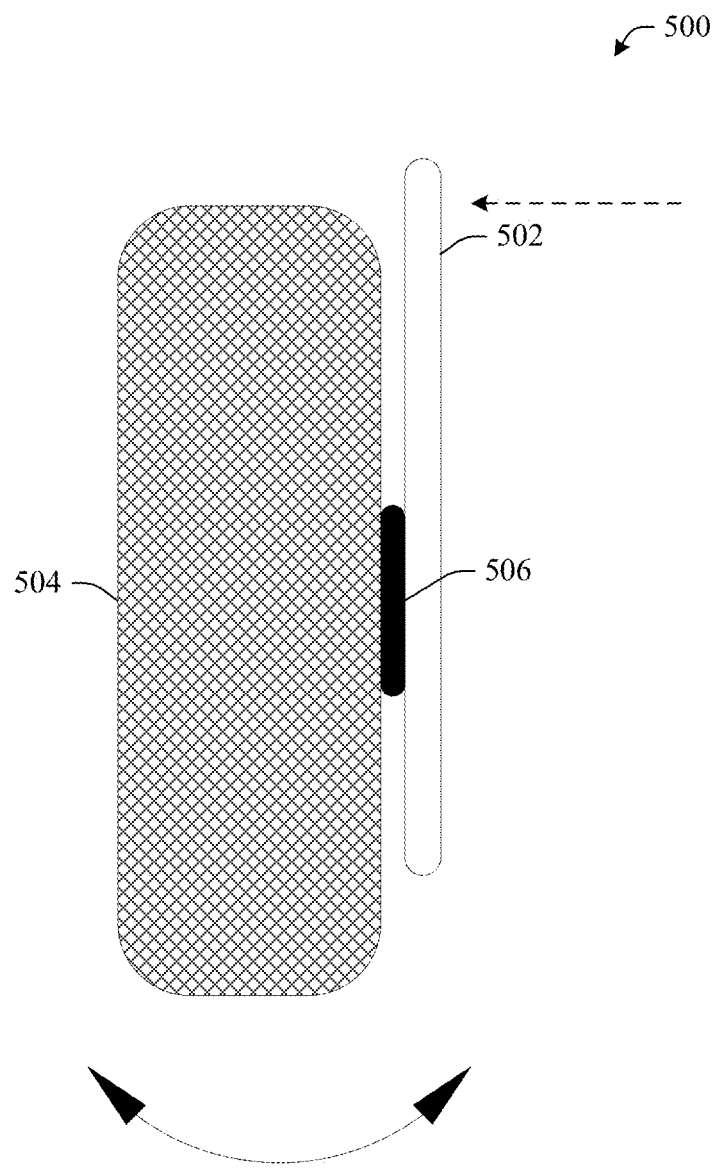
FIG. 5 illustrates an alternative example wheel cover assembly in accordance with aspects of the innovation.

Turning now to FIG. 5, an alternative example of a wheel cover assembly 500 is shown in accordance with aspects of the innovation. As illustrated, the assembly 500 can include a panel 502 that is non-rotatably mounted to a wheel 504. In this aspect, the cover 502 can employ a rotatable adapter or mounting plate 506. Here, the plate 506 can be attached to a wheel and include bearings or the like that enable the adapter to spin with the wheel 506 while maintaining the position of the panel 502 (e.g., held stationary without spinning).

It will be appreciated that, because the panel does not rotate in this example, the shape can be consistent with that of FIGS. 1, 2 and 3 herein. Similarly, as indicated by the dashed arrow in FIG. 5, the panel 502 can, if desired, be mounted at a height above the tire height. These features, functions and benefits will be appreciated by those skilled in the art. Further, consistent with FIGS. 5 and 6 (infra), the panel 502 is capable of tracking the direction of the wheel 504 as indicated by the arc-shaped arrow.

Figure 6:
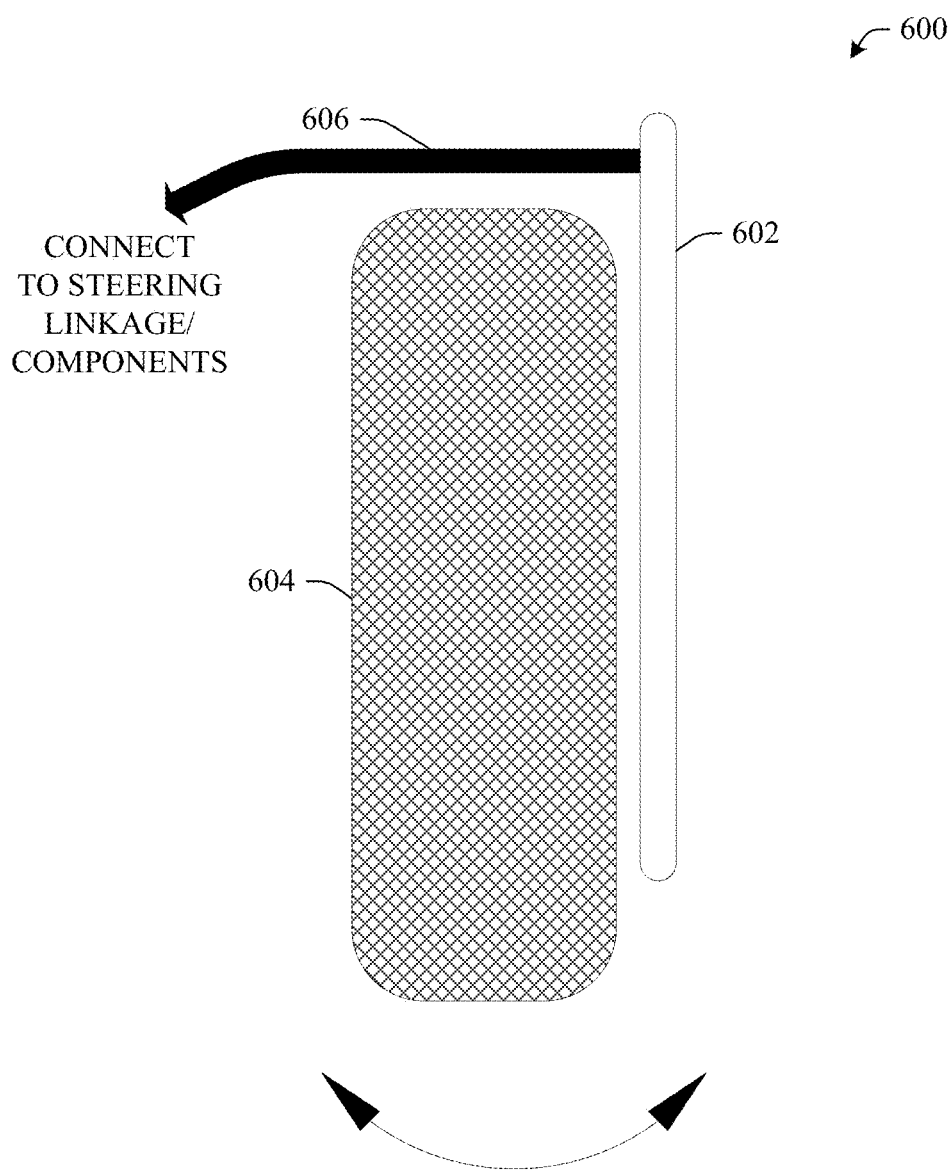
FIG. 6 illustrates an alternative example wheel cover assembly in accordance with aspects of the innovation.

Referring now to FIG. 6, an alternative example of a wheel cover assembly 600 is shown in accordance with aspects. Generally, the assembly includes a panel 602 that shields or otherwise covers a wheel 604. The cover 602 can be attached to steering, linkage, suspension or other components by mechanism (e.g., linkage) 606. It will be appreciated that most any means of attaching the panel 602 to the steering components can be used without departing from the spirit and/or scope of the innovation as described herein.

While specific configurations are shown and described in this specification, it will be understood that other aspects can be employed that facilitate the features, functions and benefits of the innovation. For instance, other aerodynamic wheel covers can be employed upon the front wheels of a long haul truck. Similarly, other aspects can include components and connections that enable panels to track or turn with the steering of a vehicle, e.g., long haul truck. These aspects are to be included within the scope of this specification.

While the aspects described herein are directed to long haul truck applications, it is to be understood that the features, functions and benefits of the innovation can be applied to most any land vehicle without departing from the spirit and scope of this disclosure. Additionally, deflector (or deflector apparatus) 204, louvers 104 or the like can be employed so as to alleviate forces of air upon the panes, e.g., upon turning. Further, aspects can employ quick disconnects or hinges so as to assist in removal, for example, in maintenance situations. These alternative aspects are to be included within the scope of the innovation and claims appended hereto.

In summary, what has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wheel cover system, comprising:
   an aerodynamic panel that covers a portion of a steerable wheel of a long haul truck;
   an attachment means that connects the aerodynamic panel to a wheel area of the long haul truck; and
   a deflector apparatus that deflects a portion of air around the aerodynamic panel.

2. The system of claim 1, wherein the attachment means is a bolt-on apparatus that fixedly and rotatably attaches to the wheel, wherein the aerodynamic panel tracks direction and position of the steerable wheel.

3. The system of claim 1, wherein the attachment means is a bolt-on apparatus that fixedly and non-rotatably attaches to the wheel, wherein the aerodynamic panel tracks direction of the steerable wheel.

4. The system of claim 3, further comprising an mounting plate that rotatably attaches between the steerable wheel and the aerodynamic panel, wherein the aerodynamic panel tracks direction of the steerable wheel.

5. The system of claim 1, wherein the attachment means connects the aerodynamic panel to steering linkage of the long haul truck.

6. The system of claim 1, wherein the aerodynamic panel is one of a plastic or composite panel.

7. The system of claim 1, wherein the aerodynamic panel includes a plurality of louvers capable of alleviating aerodynamic pressure upon the aerodynamic panel.

8. A system of alleviating aerodynamic forces, comprising:
means for attaching a panel to a wheel area of a vehicle, wherein the panel covers at least a portion of a wheel, and wherein the means for attaching is a linkage mechanism that attaches to one of a steering or suspension component of a vehicle;
means for tracking direction of the wheel as a function of steering; and
means for pivoting the panel in synchronization with the tracked direction.

9. The system of claim 8, wherein the panel is a plastic panel.

10. A method of regulating aerodynamic flow, comprising:
attaching a panel to a wheel area of a vehicle;
tracking position of a wheel positioned within the wheel area;
attaching the panel to a plurality of lugs of the wheel; and
pivoting the panel in accordance with a direction of the wheel.

11. The method of claim 10, wherein the panel is a composite panel.

12. The method of claim 10, further comprising attaching the panel to a steering mechanism of a vehicle.

13. The method of claim 10, wherein the panel is rotatably mounted.

14. The method of claim 10, wherein the panel is non-rotatably mounted.

15. The method of claim 10, wherein the panel is a half-moon shaped panel.

16. The system of claim 1, wherein the attachment means includes a linkage mechanism that attaches to one of a steering or suspension component of a vehicle.

17. The system of claim 1, wherein the attachment means includes a rotatable hub that connects the panel to the wheel.

18. The system of claim 1, wherein the attachment means includes a non-rotatable hub that connects the panel to the wheel.

19. The system of claim 8, further comprising means for deflecting a portion of air around the aerodynamic panel.

20. The method of claim 10, further comprising opening at least one louver to permit airflow through the panel.

* * * * *